United States Patent [19]

Wiese et al.

[11] Patent Number: 5,202,043

[45] Date of Patent: Apr. 13, 1993

[54] PROCESS FOR THE PREPARATION OF ISOMETRIC MAGNETIC IRON OXIDE

[75] Inventors: Jürgen Wiese; Gunter Buxbaum; Wilfried Burow, all of Krefeld, Fed. Rep. of Germany

[73] Assignee: Bayer Aktiengesellschaft, Leverkusen, Fed. Rep. of Germany

[21] Appl. No.: 267,978

[22] Filed: Nov. 7, 1988

Related U.S. Application Data

[63] Continuation of Ser. No. 813,411, Dec. 26, 1985, abandoned.

[30] Foreign Application Priority Data

Jan. 9, 1985 [DE] Fed. Rep. of Germany ....... 3500471

[51] Int. Cl.$^5$ .............................................. C01G 49/02
[52] U.S. Cl. ................... 252/62.56; 423/632; 423/634
[58] Field of Search .................... 252/62.56; 423/632, 423/633, 634

[56] References Cited

U.S. PATENT DOCUMENTS

| | | | |
|---|---|---|---|
| 4,052,326 | 10/1977 | Schoenafinger et al. | 252/62.56 |
| 4,371,567 | 2/1983 | Chamard et al. | 252/62.56 |
| 4,650,597 | 3/1987 | Hibst et al. | 252/62.56 |

FOREIGN PATENT DOCUMENTS

| | | | |
|---|---|---|---|
| 2801395 | 7/1979 | Fed. Rep. of Germany | 423/633 |
| 57-175734 | 10/1982 | Japan | 423/633 |
| 58-135135 | 8/1983 | Japan | 423/633 |

*Primary Examiner*—Jack Cooper
*Attorney, Agent, or Firm*—Connolly and Hutz

[57] ABSTRACT

Isometric iron oxide pigments are prepared by an improved process by precipitation of aqueous solutions containing iron (II) salts with alkaline precipitating agents followed by oxidation of the precipitate at temperatures of from 20° C. to 100° C., wherein the improvement comprises adjusting the iron (III) content to 1 to 25 mol %, based on the total iron, before precipitation.

3 Claims, 1 Drawing Sheet

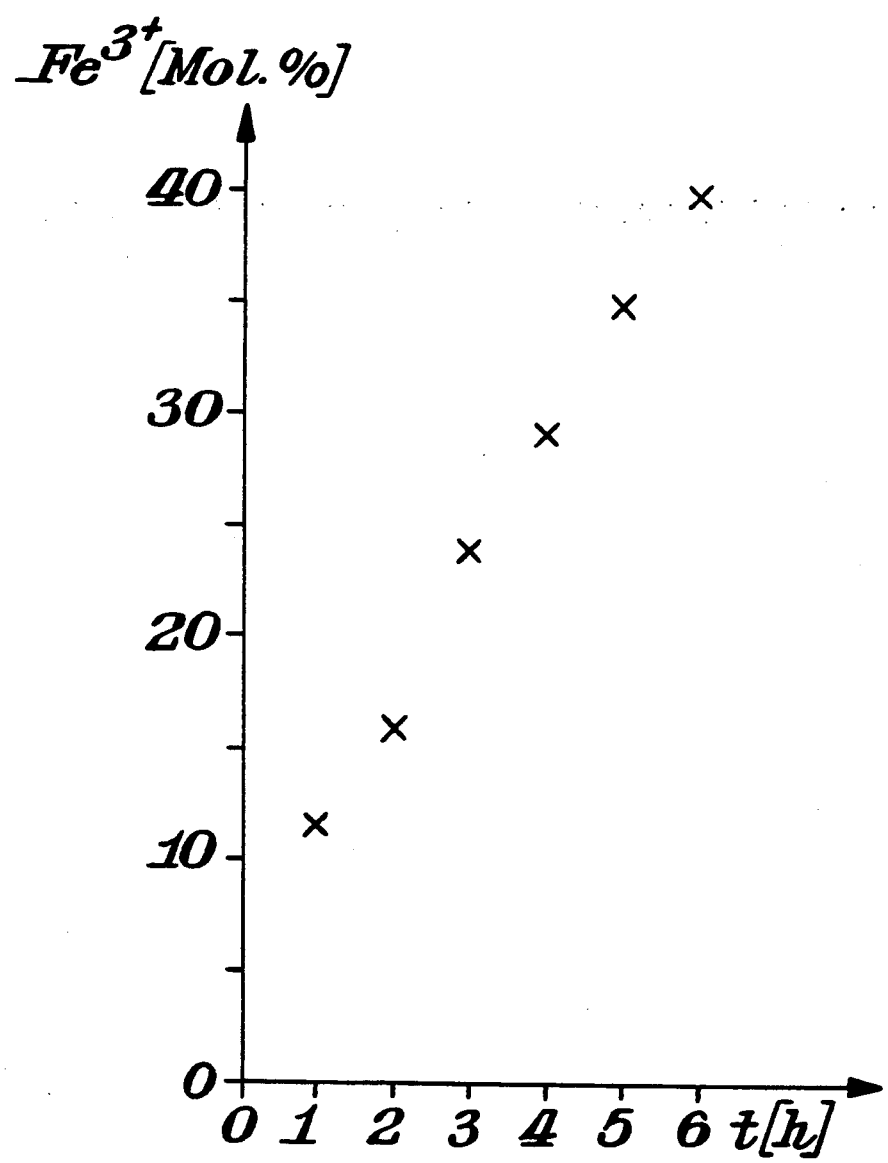

PROCESS FOR THE PREPARATION OF ISOMETRIC MAGNETIC IRON OXIDE

This application is a continuation of application Ser. No. 06/813,411 filed Dec. 26, 1985 now abandoned.

BACKGROUND OF THE INVENTION

This invention relates to a process for the preparation of isometric magnetic iron oxides by the precipitation of aqueous solutions containing iron (II) salts with alkaline precipitating agents followed by oxidation at temperatures of from 20° C. to 100° C.

The earliest magnetic recording processes used magnetic sound recording media containing isometric carbonyl iron powder of $\gamma$-$Fe_2O_3$ pigment. For some time now, however, the use of isometric pigments has to a large extent been replaced by the use of needle-shaped pigments in the field of magnetic media. Needle-shaped pigments have a higher coercivity than isometric pigments by virtue of their anisotropy due to their form, and they generally have a high remanence if they are orientated in the direction of recording when the tape is being produced. For a long time, therefore, developments have been virtually confined to those processes which enable pigments with a controlled needle shape to be produced.

It is only in more recent times that the advantages of isotropic recording media have again been considered (EP-A 0,044,258 and EP-A 0,043,882) although such media were proposed as early as 1955 (U.S. Pat. No. 2,941,901). Isometric magnetic particles are isotropic in their behavior and therefore very suitable for the production of isotropic magnetic recording materials such as those required, for example, for data recording.

Other fields of application of isometric magnetic oxides include the magnetic one-component toners as used in modern electrostatic photocopying systems and the magnetic printing dyes for use in magnetic printers or for marking bank notes.

Isometric magnetic pigments require, like all pigments for magnetic recording processes, a manufacturing process which is technically simple to carry out and which enables the properties of the product to be accurately controlled.

Processes for the preparation of isometric magnetic iron oxide pigments are known, DE-PS 891,625, for example, proposes the oxidation of alkaline precipitates of iron (II) salts with nitrate under pressure. The application of pressure renders this process expensive and complicated. DE-AS 1,112,725 proposes the alkaline precipitation of iron (III) salts. The production of magnetic oxides, however, requires a hydrothermal treatment of the oxides followed by reduction with hydrogen at elevated temperature. DE-PS 944,427 proposes the precipitation of iron oxalate which must subsequently be decomposed by heat. This process is problematic for various reasons. Thus, oxalates have a very high tendency to form dust and are difficult to handle in the apparatus required for their decomposition.

DE-OS 2,612,798 proposes for the preparation of isometric iron oxides by the precipitation of iron (II) salts with alkaline precipitating agents and oxidation. With this process, however, it is only possible to produce magnetites in the form of coarse particles. Finely divided isometric megnetites are obtainable according to DE-OS 2,617,569 by the preparation of mixtures of iron (II) and iron (III) salts in proportions corresponding to the stoichiometry of the megnetite, followed by alkaline precipitation. This process requires the use of iron (III) salts which are not only expensive but, in the case of $FeCl_3$, also corrosive. The pigments obtained by this prior art process are superparamagnetic and unsuitable for magnetic recording purposes.

BRIEF DESCRIPTION OF THE INVENTION

It is therefore an object of the present invention to provide a technically simple, cost effective process for the preparation of isometric magnetic iron oxide pigments having a specified particle size and high specific surface area.

It has now been found that this is achieved by adjusting the iron oxide solutions to a specified iron (III) content prior to precipitation in the process of oxidation of iron (II) salts.

DETAILED DESCRIPTION

The present invention thus provides a process for the preparation of isometric magnetic iron oxides by the precipitation of aqueous solutions containing iron (II) salts with alkaline precipitating agents followed by oxidation at temperatures of from 20° C. to 100° C., in which the iron (III) content is adjusted to 1-25 mol %, based on the total iron content, before the alkaline precipitating agent is added.

According to the invention, oxidation is carried out in an aqueous iron (II) salt solution at a pH below 3, advantageously with air. For rapid oxidation, the air is finely subdivided in the solution by means of a suitable apparatus such as, for example, a gasing stirrer, bubble cap column, radiator or loop reactor. The surprisingly high speed of oxidation, which is contrary to a widely held opinion (Gmelin 59 B, pages 805 et seq) can be seen from the FIGURE.

BRIEF DESCRIPTION OF THE FIGURE

The FIGURE is a graphical representation of the mole percent of iron (III) at various times.

Oxidation is stopped when the necessary iron (III) content for obtaining the desired fine degree of subdivision of the end product has been reached.

A great advantage of the process according to the invention may be seen in the fact that iron (II) sulphates and/or chlorides obtained from steel pickling works and/or titanium dioxide factories can be used for the solutions containing iron (II) salts. Such solutions normally contain a small, uncontrolled proportion of iron (III) salts. A proportion of less than 0.5 mol % of $Fe^{3+}$, based on the total iron content, is typical.

The relationship between the initial iron (III) content and the fineness of subdivision of the pigments is demonstrated in the examples which follow. To obtain a specific surface area of end product of from 5 to 50 $m^2/g$, an iron (III) content of from 1 to 25 mol %, based on the total iron content, is necessary.

The particle size is defined by the specific surface area (BET process with nitrogen), which has a value of from 5 to $50^2 m/g$ in particles prepared by the process according to the invention. Another method of determining the size of the pigment particles is that of radiographic determination of the crystallite size, which approximately corresponds to the particle diameter. The particle diameter d and specific surface area 0 are theoretically related to each other according to the following equation:

$$O = \frac{60\,000}{P \cdot d}$$

In the above equation, 0 is given in terms of m²/g, d in terms of Å and the density of the pigment in terms of g/cm³. Magnetite is assumed to have an apparent density of 4.8, so that the equation may be simplified as follows:

$$O = \frac{12\,500}{d}$$

Additional salts may be added before or after oxidation, e.g. salts containing Co, Mn, Zn, Al and/or phosphate ions. Adjustment of the initial $Fe^{3+}$ content is followed by precipitation with an alkaline precipitating agent. The precipitating agents used are preferably NaOH, $Na_2CO_3$, $NH_3$, MgO and/or $MgCO_3$, and the degree of precipitation should be in the region of from 0.9 to 2.0, preferably from 1.0 to 1.2.

If the agent is added in the stoichiometric quantity, the degree of precipitation is 1. The addition of a subequivalent quantity or excess of precipitating agent, based on the Fe salt, corresponds to an equal percentage lowering or increase in the degree of precipitation. The process is most economical within the preferred range and any added ions are particularly easily combined into the resulting iron oxide in this range. Precipitation is followed by oxidation with air, which is continued until the precipitated hydroxide has been completely converted into crystalline iron oxide.

The magnetic iron oxides prepared according to the invention fulfil the required property of fineness of subdivision in the range of from 5 to 50 m²/g of specific surface area. Any increase of coercivity is preferably obtained by the addition of from 0.5 to 15 mol % of cobalt in the form of cobalt salt before precipitation. The magnetic properties of the pigments obtained by the process according to the invention may be improved if, after precipitation and oxidation, the pigment is not only washed and dried but subjected to a heat treatment.

The heat treatment is normally carried out in rotatable, heated converters or tubes. It may be carried out by various methods. Tempering in a non-oxidizing atmosphere at 200° to 600° C., preferably 300° to 450° C., has been found to be advantageous. Oxidation under air at 100° C. to 600° C., preferably 300° C. to 450° C., may also be carried out, either after or instead of the aforesaid tempering treatment. This method may be used, for example for obtaining isometric $\gamma$-$Fe_2O_3$. For increasing the magnetic remanence, it is advantageously to temper the pigment in a reducing atmosphere, preferably in moist hydrogen, at 200° C. to 600° C., preferably 200° C. to 450° C., and optionally reoxidize it at temperatures of from 100° C. to 600° C., preferably from 300° C. to 450° C. Isometric magentic iron oxide pigments with any degree of oxidation can be obtained by these means. The present invention also relates to the use of the pigments prepared according to the invention for the preparation of toners, printing dyes and magnetic recording media.

The following Examples are intended to illustrate the invention without limiting it.

The magnetic data were obtained by measurements in a maximum field of 280 kA/m. The powder samples were in small tubes 4 cm in length and 7 mm in diameter.

EXAMPLE 1

An aqueous solution containing 21.7 mol of $FeSO_4$ in 22 l of solution was prepared in a 300 liter container equipped with gasing stirrer. The pH is 2.1. An $Fe^{3+}$ content of 0.45 mol % is determined by titration before oxidation. The solution is heated to 70° C. and air is introduced by means of the gasing stirrer. The table below shows the increase of $Fe^{3+}$ content with reaction time. This relationship is further clarified by the graph in the FIGURE.

| Time [h] | $Fe^{3+}$ [mol %] |
| --- | --- |
| before starting | 0.45 |
| after heating under air (½ h) | 4.0 |
| 1 | 11.8 |
| 2 | 18.0 |
| 3 | 24.0 |
| 4 | 29.2 |
| 5 | 35.4 |
| 6 | 40.7 |

EXAMPLE 2

22 liters of aqueous solution containing 21.7 mol of $FeSO_4$, pH 1.9, are oxidized with air to an $Fe^{3+}$ content of 8.1 mol % at 70° C. This is followed by precipitation with sodium hydroxide solution (degree of precipitation 1.03) and oxidation with air. The product is washed and dried at 40° C.

| | |
| --- | --- |
| Coercivity | 43.3 kA/m |
| remanence | 41.8 nTm³/g |
| crystallite size | 38 nm |
| specific surface area | 28 m²/g |

EXAMPLE 3

In a container as described in Example 1, 22 liters of an aqueous solution containing 21.7 mol of $FeSO_4$ are acidified with 250 ml of 25% sulphuric acid and oxidized with air at 70° C. to an $Fe^{3+}$ content of 9.3 mol %. This is followed by precipitation with sodium hydroxide solution (degree of precipitation 1.03) and oxidation with air. The product is washed and dried.

| | |
| --- | --- |
| Coercivity | 13.85 kA/m |
| Remanence | 19.5 nTm²/g |
| Crystallite size | 29.5 nm |
| Specific surface area | 30 m²/g |

EXAMPLE 4

In a container as described in Example 1, 22 liters of an aqueous solution containing 21.7 mol of $FeSO_4$ are heated to 70° C. and adjusted with air to an $Fe^{3+}$ content of 1.0 mol %. This is followed by precipitation with sodium hydroxide solution (degree of precipitation 1.0) and oxidation with air. The pigment is washed and dried.

| | |
| --- | --- |
| Coercivity | 9.63 kA/m |
| Remanence | 10.2 nTm³/g |
| Crystallite size | 92 nm |

| | |
|---|---|
| -continued | |
| Specific surface | 9.5 m²/g |

EXAMPLE 5

The pigment of Example 2 is tempered for 3 hours in air at 400° C. Tempering is carried out in a laboratory rotary converter.

| | |
|---|---|
| Coercivity | 84.2 kA/m |
| Remanence | 45.4 nTm²/g |

EXAMPLE 6

The pigment according to Example 5 is tempered in a laboratory rotary converter at 500° C. for 30 minutes and then reduced with moist hydrogen at 400° C. for 100 minutes and finally reoxidized with air at 400° C. for 3 hours.

| | |
|---|---|
| Coercivity | 70.9 kA/m |
| Remanence | 65.4 nTm²/g |

COMPARISON EXAMPLE 20 liters of an aqueous solution of 15 mol of $Fe_2(SO_4)_3$ and 7.7 mol of $FeSO_4$ are prepared in a container as described in Example 1. The product is then precipitated with sodium hydroxide solution, washed and dried.

| | |
|---|---|
| Coercivity | 0 kA/m |
| Remanence | 0 nTcm³/g |
| crystallite size | 11 nm |
| specific surface area | 110 m²/g |

The product is superparamagnetic. It is unsuitable for recording purposes due to lack of remanence.

What is claimed is:

1. A process for the preparation of isometric magnetic iron oxides comprising the steps of 1) oxidizing an aqueous solution containing iron (II) sulfate with air at a pH less than 3 until the resulting aqueous solution contains from about 1 to 25 mol %, based on the total iron, iron (III), 2) precipitating the aqueous solution with an alkaline precipitating agent, 3) oxidizing the precipitant at a temperature of from 20° C. to 100° C., 4) washing, then drying, the thus formed iron oxide and 5) heat treating the iron oxide by tempering in a non-oxidizing atmosphere at 200° C. to 600° C., tempering with a reducing agent which increases the magnetic remanence of said oxide at 200° C. to 600° C. or oxidizing with air at 300° to 450° C.

2. A process according to claim 1, wherein the heat treatment is a tempering in a non-oxidizing atmosphere at 200° to 600° C.

3. A process according to claim 2 wherein the tempering is at 300° to 450° C.

* * * * *